United States Patent
Miyazawa

(10) Patent No.: US 9,363,332 B2
(45) Date of Patent: Jun. 7, 2016

(54) COMMUNICATION APPARATUS, MOBILE DEVICE AND STORAGE MEDIUM

(71) Applicant: BROTHER KOGYO KABUSHIKI KAISHA, Nagoya-shi, Aichi-ken (JP)

(72) Inventor: Masafumi Miyazawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/579,382

(22) Filed: Dec. 22, 2014

(65) Prior Publication Data

US 2015/0189499 A1    Jul. 2, 2015

(30) Foreign Application Priority Data

Dec. 27, 2013  (JP) .................................. 2013-270668

(51) Int. Cl.
H04M 3/00 (2006.01)
H04L 29/08 (2006.01)
G06F 3/12 (2006.01)
H04N 1/00 (2006.01)

(52) U.S. Cl.
CPC .............. *H04L 67/322* (2013.01); *G06F 3/121* (2013.01); *G06F 3/1236* (2013.01); *G06F 3/1292* (2013.01); *H04N 1/00127* (2013.01); *H04L 67/12* (2013.01)

(58) Field of Classification Search
CPC ....... H04L 67/12; H04L 67/322; G06F 3/121; G06F 3/1236; G06F 3/1292; H04N 1/00127
USPC ............................... 455/418, 419, 403, 550.1
See application file for complete search history.

(56) References Cited

U.S. PATENT DOCUMENTS

| 8,301,898 B2 * | 10/2012 | Kishi ..................... G06F 21/608 455/556.1 |
| 8,571,602 B2 * | 10/2013 | Horton ............... H04N 1/00132 358/1.15 |
| 2008/0248828 A1 * | 10/2008 | Tomiyasu ......... H04M 1/72522 455/550.1 |
| 2009/0086262 A1 * | 4/2009 | Suzuki ............... H04N 1/00222 358/1.15 |

FOREIGN PATENT DOCUMENTS

| JP | 2000330738 A | * 11/2000 |
| JP | 2006087001 A |   3/2006 |
| JP | 2007128357 A | *  5/2007 |

* cited by examiner

*Primary Examiner* — Khai M Nguyen
(74) *Attorney, Agent, or Firm* — Scully, Scott, Murphy & Presser, P.C.

(57) ABSTRACT

A communication apparatus configured to form a first state, which is a specific state for performing communication with a first mobile device having a telephone function, and a second state, which is the specific state, if call receiving information, which is output from the first mobile device due to the first mobile device receiving a call request from external, is received while the first state is formed. In the first state, an execution of first processing instructed from the first mobile device is capable and an execution of a plurality of processing including the first processing, which is instructed from a second mobile device different from the first mobile device, is incapable. In the second state, an execution of a part of processing among the plurality of processing incapable in the first state is capable.

13 Claims, 10 Drawing Sheets

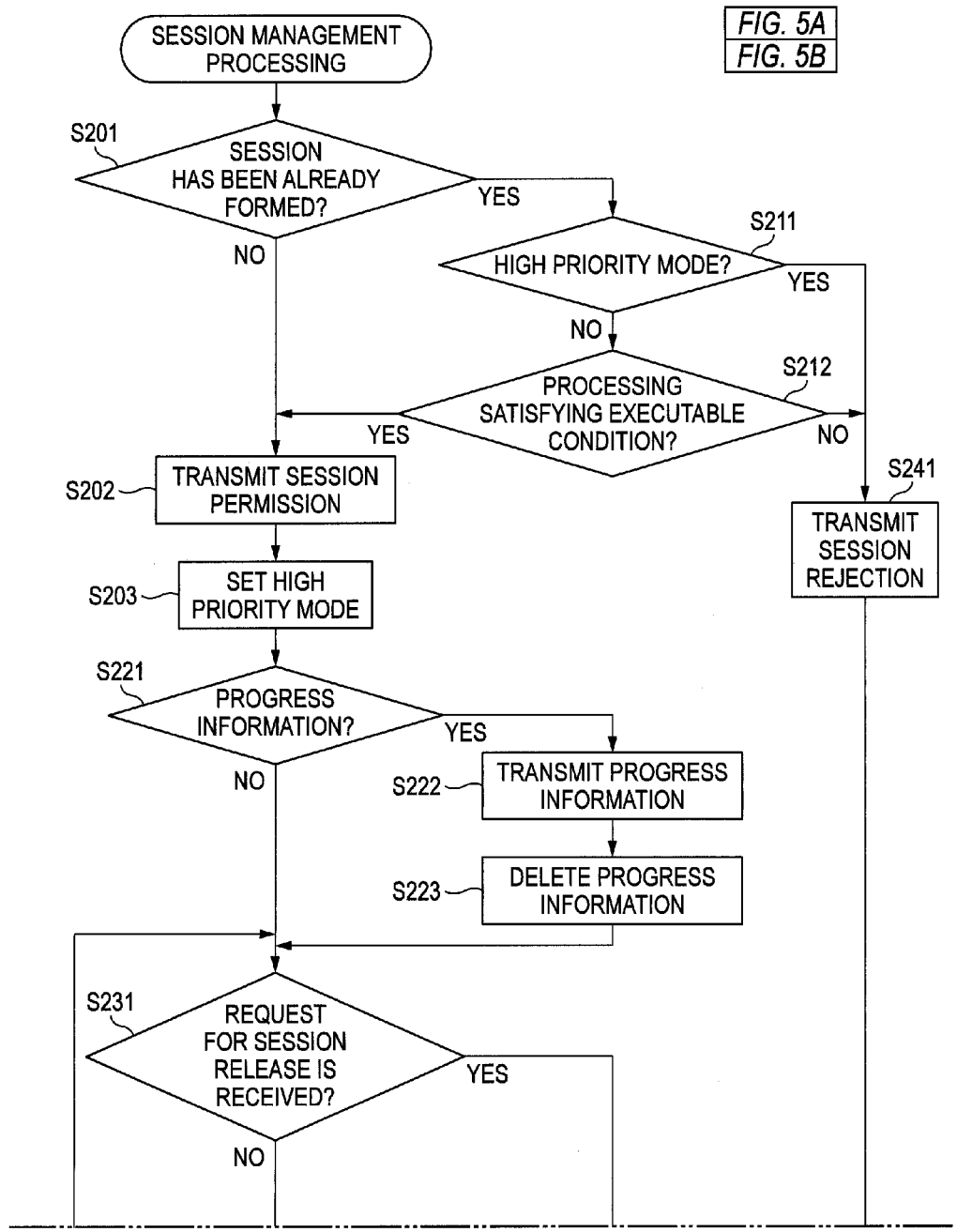

FIG. 6

| EXISTING SESSION | SESSION OF THIS TIME | | | | | | |
|---|---|---|---|---|---|---|---|
| | COPY | FAX TRANSMISSION | FAX RECEPTION AND TRANSFERRING | PHONE DIRECTORY READING | PHONE DIRECTORY WRITING | SCAN | PRINT |
| COPY | × | × | ○ | ○ | ○ | × | × |
| FAX TRANSMISSION | × | ○ | ○ | ○ | × | × | ○ |
| FAX RECEPTION AND TRANSFERRING | ○ | ○ | ○ | ○ | ○ | ○ | ○ |
| PHONE DIRECTORY READING | ○ | ○ | ○ | ○ | × | ○ | ○ |
| PHONE DIRECTORY WRITING | ○ | × | ○ | ○ | × | ○ | ○ |
| SCAN | × | × | ○ | ○ | ○ | × | ○ |
| PRINT | × | ○ | ○ | ○ | ○ | ○ | ○ |

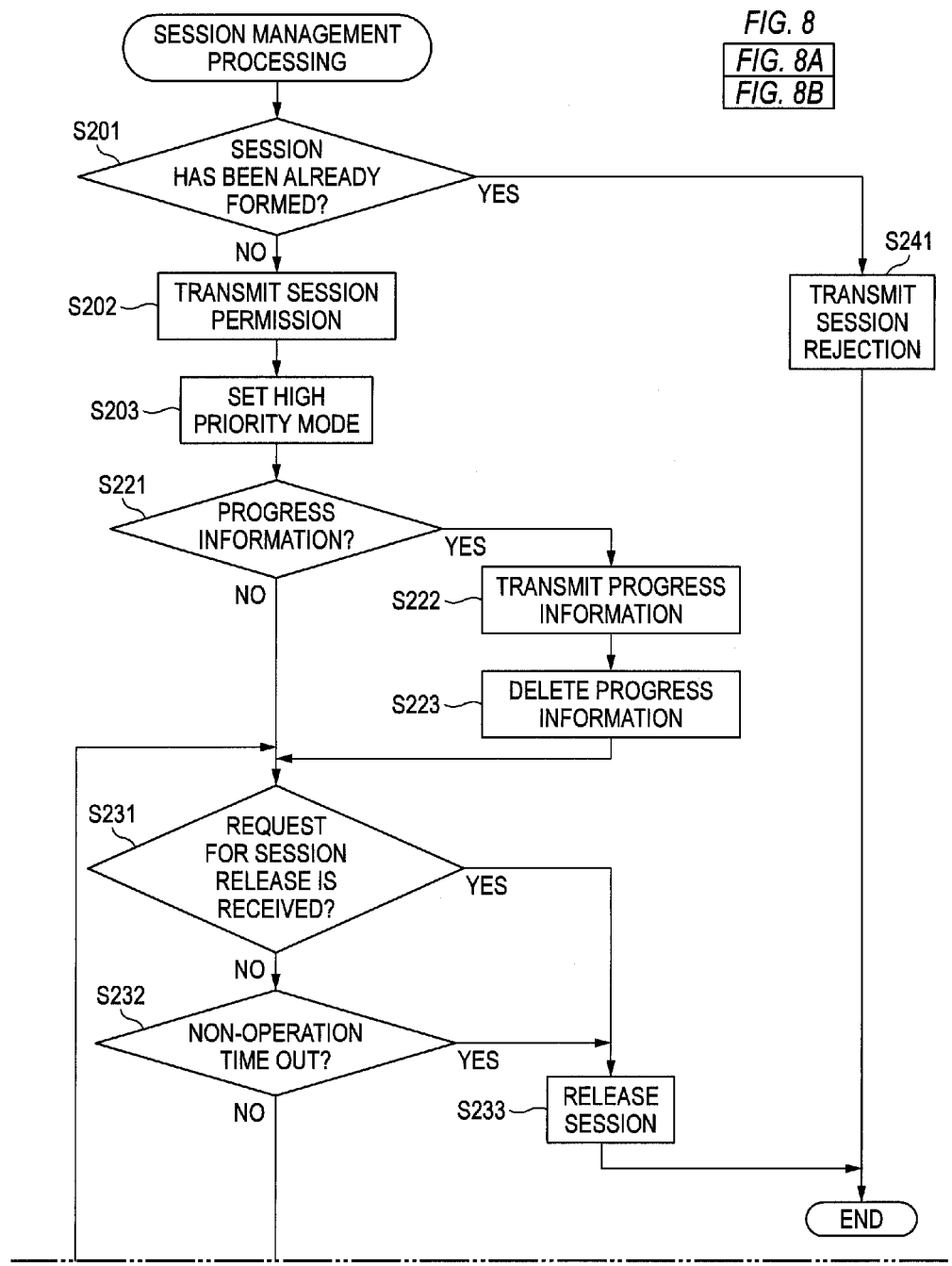

COMMUNICATION APPARATUS, MOBILE DEVICE AND STORAGE MEDIUM

CROSS-REFERENCE TO RELATED APPLICATIONS

This application claims priority from Japanese Patent Application No. 2013-270668 filed on Dec. 27, 2013, the entire contents of which are incorporated herein by reference.

TECHNICAL FIELD

Aspects of the present invention relate to a communication apparatus, a mobile device configured to form a specific state for performing communication with the communication apparatus and request the communication apparatus to perform processing, and a storage medium.

BACKGROUND

In a system where a plurality of mobile devices uses a communication apparatus, there is known processing of forming a specific state for performing communication between a mobile device and the communication apparatus. By performing the processing, the mobile device is enabled to use a predetermined function of the communication apparatus and the other mobile devices are restricted from using the predetermined function of the communication apparatus.

Regarding the technology of restricting the using, for example, a printer system is known. In the printer system, when a printer server receives an occupying print request from an information processing apparatus, the printer is set to an occupied state and a processing request for a print job from the other information processing apparatuses is rejected until a print job from the information processing apparatus, from which the occupying print request us received, is completed or until a predetermined occupied time period is over.

SUMMARY

However, the above technology has the following problems. That is, in a mobile device having a phone function and in which a specific state is formed between the communication apparatus, when the mobile device receives an incoming call from external and thus a telephone call starts, the communication with the communication apparatus may become unable to be continued. In this case, there is a problem that the communication apparatus cannot be effectively utilized.

Accordingly, aspects of the present invention provide a technology enabling a communication apparatus to be effectively utilized even when a mobile device receives an incoming call at a state where a specific state for performing communication with the communication apparatus is formed.

According to an aspect of the present invention, there is provided a communication apparatus configured to perform communication with a mobile device, the communication apparatus including: a processor; and a memory storing instructions that, when executed by the processor, cause the communication apparatus to perform: forming a first state which is a specific state for performing communication with a first mobile device having a telephone function, wherein, in the first state, an execution of first processing instructed from the first mobile device is capable, and wherein, in the first state, an execution of a plurality of processing including the first processing, which is instructed from a second mobile device different from the first mobile device, is incapable, and forming a second state, which is the specific state, instead of the first state, if call receiving information, which is output from the first mobile device due to the first mobile device receiving a call request from external, is received while the first state is formed, wherein, in the second state, an execution of a part of processing among the plurality of processing incapable in the first state is capable.

According to another aspect of the present invention, there is provided a mobile device capable of performing communication with a communication apparatus, the mobile device including: a processor; and a memory storing instructions that, when executed by the processor, cause the mobile device to perform: forming a specific state in which first processing can be executed by the communication apparatus; storing an execution state of the first processing when a call request is received in a state where the specific state is formed, and resuming the first processing based on the stored execution state and progress information when the progress information, which is output from the communication apparatus due to the specific state being formed, is received.

According to another aspect of the present invention, there is provided a non-transitory computer readable storage medium having a computer program stored thereon and readable by a computer of a communication apparatus, the computer program, when executed by the computer, causing the communication apparatus to perform operations including: forming a first state which is a specific state for performing communication with a first mobile device having a telephone function, wherein, in the first state, an execution of first processing instructed from the first mobile device is capable, and wherein, in the first state, an execution of a plurality of processing including the first processing, which is instructed from a second mobile device different from the first mobile device, is incapable, and forming a second state, which is the specific state, instead of the first state, if call receiving information, which is output from the first mobile device due to the first mobile device receiving a call request from external, is received while the first state is formed, wherein, in the second state, an execution of a part of processing among the plurality of processing incapable in the first state is incapable.

According to the aspect of the present invention, it is possible to implement the technology enabling the communication apparatus to be effectively utilized even when the mobile device receives an incoming call at the state where the specific state for performing communication with the communication apparatus is formed.

BRIEF DESCRIPTION OF DRAWINGS

FIG. 6 is a matrix showing whether respective functions of the MFP can be executed during the session formation;

DETAILED DESCRIPTION

Hereinafter, a communication apparatus and a mobile device of an illustrative embodiment will be described in detail with reference to the accompanying drawings. In the illustrative embodiment, the present invention is applied to an image processing system including a complex machine (MFP; Multi Functional Peripheral) having an image processing function, and a mobile device performing communication with the MFP.

Figure 1:
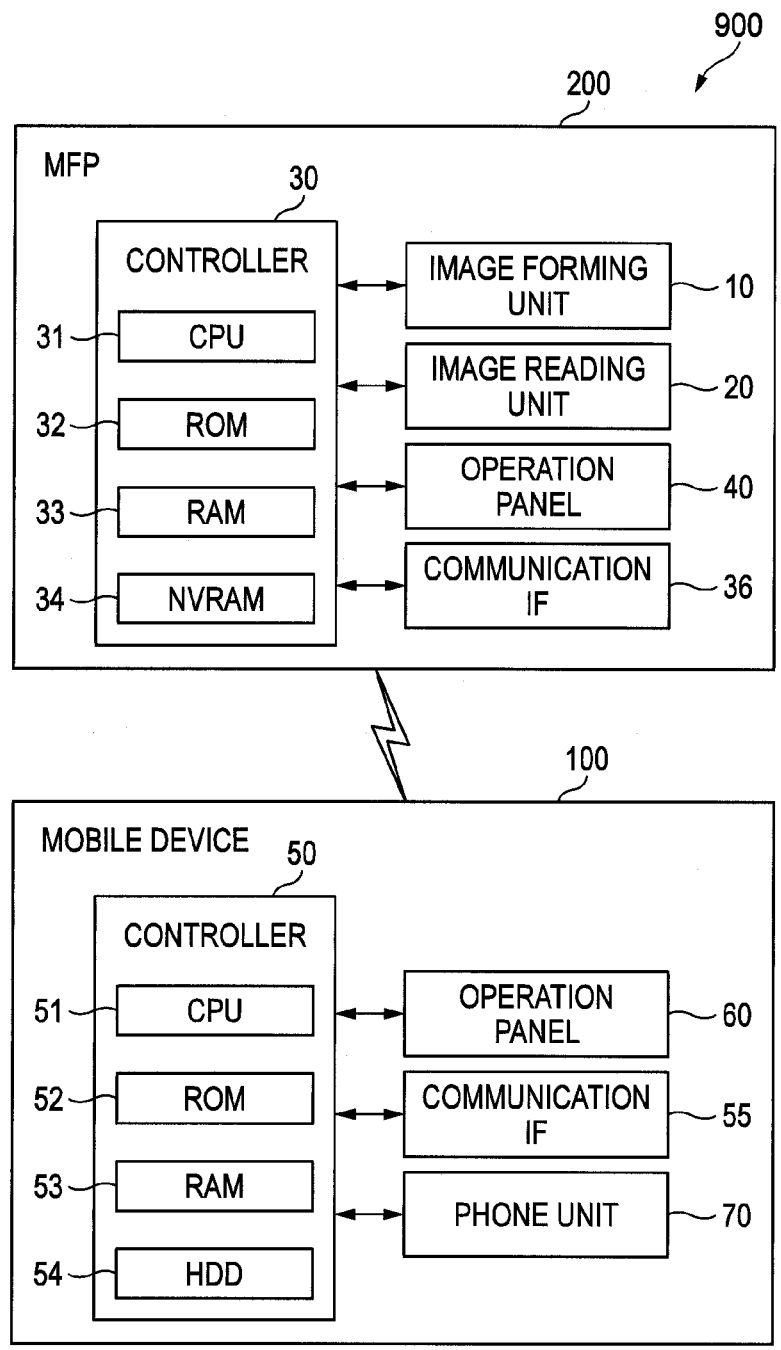
FIG. 1 is a block diagram showing a configuration of an image processing system according to an illustrative embodiment.

As shown in FIG. 1, an image processing system 900 of the illustrative embodiment includes a mobile device 100 having a phone function and an MFP 200 performing communication with the mobile device 100. The MFP 200 also can perform communication with other mobile devices in addition to the mobile device 100. Also, the image processing system 900 may have a server or an access point and perform communication with the MFP 200 through the server or access point from the mobile device 100. The MFP 200 is an example of a communication apparatus.

A configuration of the mobile device 100 is described. As shown in FIG. 1, the mobile device 100 includes a controller 50 having a CPU 51, a ROM 52, a RAM 53 and an HDD 54. Also, the mobile device 100 includes an operation panel 60 having a touch panel with a display function with an input function, a communication interface 55 enabling communication with an external apparatus, and a phone unit 70 implementing a phone function. The operation panel 60, the communication interface 55, and the phone unit 70 are controlled by the CPU 51. The controller 50 in FIG. 1 is a generic term of hardware used for control of the mobile device 100, such as the CPU 51. That is, it does not necessarily mean that the controller 50 indicates a single hardware provided in the mobile device 100.

The HDD 54 stores therein an OS, a browser for reading data on an Internet, application programs (hereinafter, referred to as 'applications') for implementing a variety of functions, and the like. For example, an application for implementing a phone function, and an application for instructing the MFP 200 to execute image processing such as print and scan and transmitting image data resulting from the image processing to the MFP 200 are stored in the HDD 54.

The CPU 51 stores a calculation result in the RAM 53 or HDD 54 and to execute a variety of processing, in response to a control program read out from the ROM 52 and a program read out from the HDD 54. The operations of the applications are also processed by the CPU 51.

The phone unit 70 consists of hardware for implementing a phone function, such as a microphone, a speaker, a phone line interface and the like. The communication interface 55 is hardware for performing communication with an external apparatus. The communication interface 55 includes a serial interface and a wireless communication interface for implementing wireless mobile communication, for example. The mobile device 100 can transmit and receive data to and from the MFP 200 through the communication interface 55, for example.

The operation panel 60 is provided on a front surface of the mobile device 100 and includes a variety of buttons for receiving a user's input, and a touch panel for displaying a message and a setting content. Also, various inputs can be performed by the user's touch operation to the touch panel. For example, a print setting and a selection of a job for executing the printing are input from the touch panel.

Next, a schematic configuration of the MFP 200 is described. As shown in FIG. 1, the MFP 200 includes a controller 30 having a CPU 31, a ROM 32, a RAM 33 and an NVRAM (Non Volatile RAM) 34. Also, the MFP 200 includes an image forming unit 10 that prints an image on a sheet, an image reading unit 20 that reads an image of a document, an operation panel 40 that displays an operating status and receive a user's input operation and a communication interface 36. The image forming unit 10, the image reading unit 20, the operation panel 40 and the communication interface 36 are controlled by the CPU 31. The controller 30 in FIG. 1 is a generic term of hardware used for control of the MFP 200, such as the CPU 51. That is, it does not necessarily mean that the controller 30 indicates a single hardware provided in the MFP 200.

The image forming unit 10 may execute a color printing or only a monochrome printing. In the illustrative embodiment, the image forming unit 10 can execute the color printing. Also, regarding a printing method, an electrophotographic method or an inkjet method may be adopted. The image forming unit 10 is an example of a image processing execution unit. Also, the image reading unit 20 may execute a color scanning or only a monochrome scanning In the illustrative embodiment, the image reading unit 20 can execute the color scanning Also, regarding a reading mechanism, a CCD or a CIS may be adopted.

The ROM 32 stores therein firmware, which is a control program for controlling the MFP 200, a variety of settings, initial values and the like. The RAM 33 and the NVRAM 34 are used as a work area from which the variety of control programs are read out or a storage area in which data is temporarily stored. Also, the MFP 200 has a database (hereinafter, referred to as 'phone directory') that stores therein information of destinations of facsimile (FAX) or data transmissions. The phone directory is also stored in the NVRAM 34.

The CPU 31 stores a processing result in the RAM 33 or NVRAM 34 and controls the respective constitutional elements of the MFP 200, in response to the control program read out from the ROM 32 and signals transmitted from a variety of sensors.

The communication interface 36 is hardware for performing communication with an external apparatus. The communication interface 36 includes a serial interface, a network interface, a wireless communication interface for implementing wireless mobile communication, and a FAX interface for implementing FAX transmission and reception, for example. The MFP 200 can transmit and receive data to and from the mobile device 100 through the communication interface 36, for example.

The operation panel 40 is provided on an outer surface of the MFP 200, and includes a variety of buttons for receiving a user's input and a touch panel for displaying a message and a setting content. The buttons include an OK button for inputting a print start instruction and a cancel button for inputting a print cancel instruction. Also, various inputs can be performed by a user's touch operation to the touch panel. For example, a print setting and a selection of a job for executing the printing are input from the touch panel.

As described above, the MFP 200 has the image forming function and the image reading function. Also, the MFP 200 has a FAX transmission and reception function and a phone directory editing function. For this reason, the MFP 200 can execute a variety of processing using the functions. The processing includes copy processing, FAX transmission processing, FAX reception and transferring processing, reading processing of the phone directory, writing processing of the phone directory, scanning processing and printing processing. In the meantime, the FAX reception and transferring processing is processing of receiving FAX data and forwarding the received FAX data to a designated external apparatus. The reading processing of the phone directory is processing of simply referring to the phone directory. That is, the phone directory cannot be edited in the reading processing of the phone directory. The writing processing of the phone directory is processing of editing the phone directory, such as change, addition and deletion of data.

Next, a first illustrative embodiment where the mobile device 100 of the image processing system 900 uses the MFP 200 is described. In the meantime, the existing protocol such as HTTP, SNTP and FTP may be used for data transfer between the mobile device 100 and the MFP 200.

In the image processing system 900, the mobile device 100 forms a session, which is a specific state for performing communication between the mobile device 100 and the MFP 200, so as to use the MFP 200. While the session is formed between the MFP 200 and the mobile device 100, the MFP 200 permits the mobile device 100 to use the MFP 200. Also, when the MFP 200 forms the session with the mobile device 100, the other mobile devices different from the mobile device 100 are incapable of using the MFP 200. Also, when the MFP 200 forms a session with the other mobile devices, the mobile device 100 is incapable of using the MFP 200. In the meantime, when a session is formed, in the MFP 200, input to the operation panel 40 is not permitted, except for some buttons. Further, it is not permitted to input a job through the operation panel 40.

That is, when the mobile device transmits a request for session formation to the MFP 200 before an instruction of predetermined processing so that the mobile device enables the MFP 200 to execute the predetermined processing, a session is formed between the mobile device and the MFP 200. When the session is formed, the communication using a specific protocol such as the HTTP is capable of being executed. In the MFP 200, regarding the processing using the specific protocol, only an instruction from the mobile device with which the session is formed is capable. In other words, regarding the processing using the specific protocol, an instruction from a mobile device with which the session is not formed is rejected. On the other hand, regarding processing (for example, printing processing via a driver without using the HTTP) not using the specific protocol, an instruction from a mobile device with which the session is not formed is also capable. It is assumed that the processing, which will be described hereinafter, is processing using the specific protocol.

Figure 2:
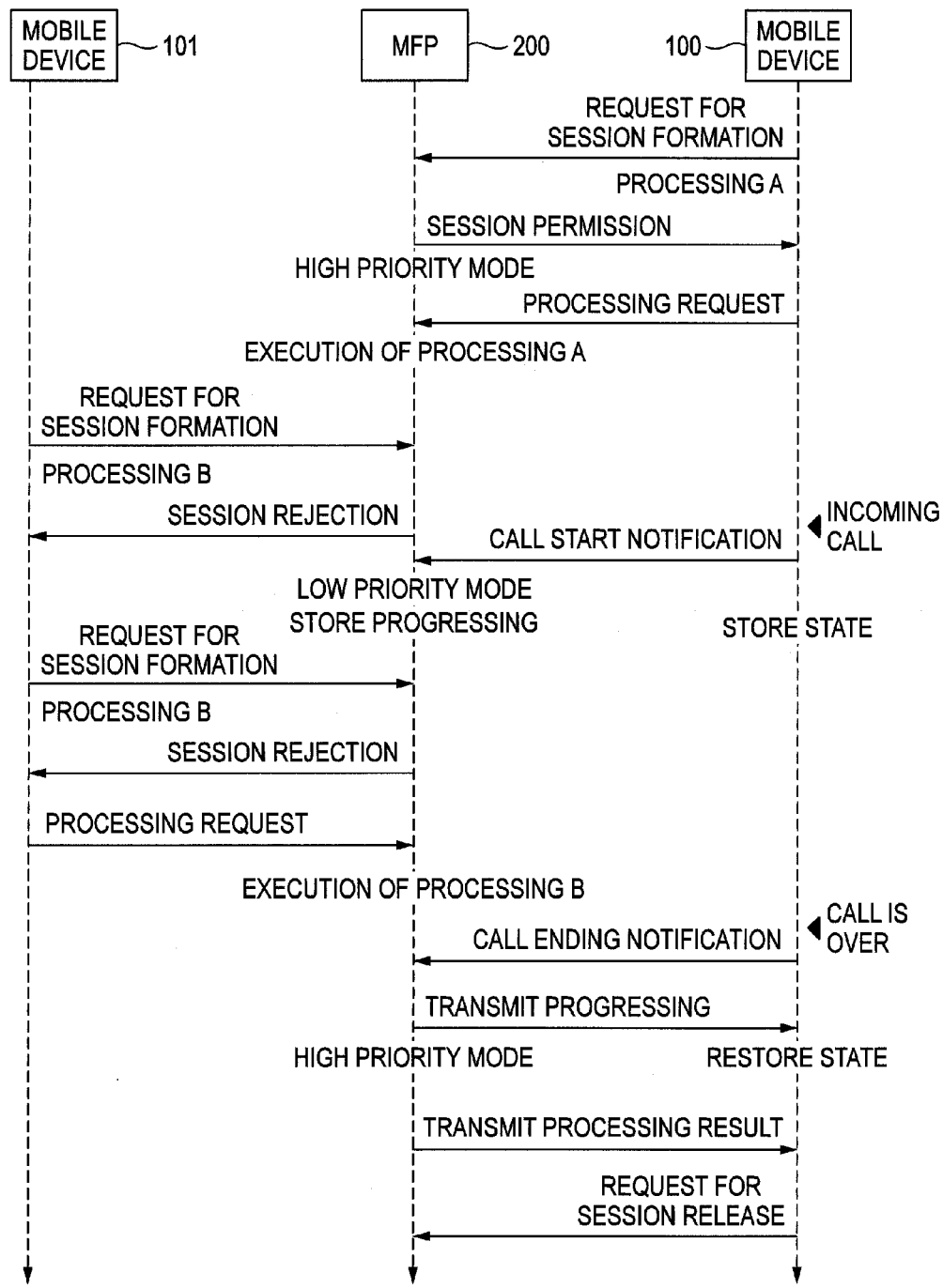
FIG. 2 is a sequence diagram showing a sequence of data communication performed between a mobile device and an MFP in a first illustrative embodiment.

In the descriptions hereinafter, the mobile device 100 forms a session with the MFP 200 at a state where the MFP 200 does not form a session with any mobile device, which will be described with reference to a sequence diagram of FIG. 2.

First, the mobile device 100 transmits a request for session formation to the MFP 200. The request for session formation is transmitted when an application in the mobile device 100 capable of requesting the MFP 200 to perform processing is activated. Information about processing of requesting the MFP 200 to permit the using thereof is also added to the request for session formation. The processing of requesting the MFP 200 to permit the using thereof may be one or more processing. Hereinafter, the processing with which the mobile device 100 requests the MFP 200 to permit the using thereof is referred to as 'processing A'. The processing A corresponds to the editing of the phone directory, for example. The processing A is an example of first processing.

Since a session with the other mobile devices is not formed, the MFP 200 sends a reply of session permission, which indicates that a session formation is permitted, to the mobile device 100. Then, the MFP 200 forms a session between the MFP 200 and the mobile device 100.

When the session is formed, the MFP 200 restricts the using thereof through the specific protocol from the other mobile device (for example, a mobile device 101), which is not the mobile device 100 with which the session is formed. An aspect of restricting the using from the other mobile device 101 is different from modes that will be described later. Also, the MFP 200 displays a message, which indicates that the communication with the mobile device 100 is being performed, on the touch panel 41 and restricts an input to the touch panel 41. Also, when the session is formed, the MFP 200 does not permit the other button group to input to the operation panel 40, except for some keys. That is, the execution of processing through the operation panel 40 is restricted.

The mobile device 100 having received the session permission transmits a processing request for the processing A to the MFP 200. After receiving the processing request, the MFP 200 starts to execute the processing A. The mobile device 100 may transmit the processing request for each job or transmit the processing request for a plurality of jobs at one time.

Here, a mode of the session is described. As aspects of the session, the MFP 200 has a high priority mode and a low priority mode. In the high priority mode, the MFP 200 executes the processing A from the mobile device 100 having formed the session, and does not form a session with the other mobile device 101. On the other hand, in the low priority mode, even when the session has been already formed, if the other mobile device 101 transmits a request for using of processing satisfying an execution permission condition, a session is also formed between the MFP 200 and the other mobile device 101 and the MFP 200 can execute the processing requested from the other mobile device 101. That is, in the high priority mode, processing for the other mobile device 101 is incapable of being executed. However, in the low priority mode, some processing for the other mobile device 101 is capable of being executed. The execution permission condition will be described in detail later. The high priority mode is an example of a first state and the low priority mode is an example of a second state. Just after the session with the mobile device 100 is formed, the high priority mode is set.

When the session is formed between the MFP 200 and the mobile device 100, the MFP 200 first operates in the high priority mode. In the high priority mode, as described above, the processing that can be instructed from the other mobile device 101 cannot be executed. For this reason, even when the MFP 200 receives a new request for session formation from the other mobile device 101, the MFP 200 sends a reply of session rejection, which indicates that a session formation is rejected, in response to the new request. In the meantime, the MFP 200 sends the reply of session rejection, irrespective of whether the processing of which the using permission is requested by the other mobile device 101 is the processing A. A session is not formed, so that the other mobile device 101 is restricted from using the MFP 200.

Here, a case where the mobile device 100 receives a phone call and a user responds thereto at a state where the session is formed between the MFP 200 and the mobile device 100 is described. When a call starts, in response to the incoming call, the mobile device 100 transmits a call start notification, which indicates that the call has started, to the MFP 200. Further, the mobile device 100 stores a state of the application at the time of the incoming call. Here, the application is an application by which the session is formed. For example, when a phone directory editing application is activated, and the user responds to the incoming call while writing in the phone directory, the mobile device 100 stores a state where the phone directory editing application instructs the writing of the information of the phone directory, i.e., a state where the writing information is being edited.

When the call start notification is received, the MFP 200 switches the session from the high priority mode to the low priority mode. That is, when the call starts from the mobile device 100, it becomes difficult for the user to continuously operate the mobile device 100, and the processing may be interrupted. For example, when the call starts during the editing of the phone directory by the phone directory application, the user cannot continue performing the phone directory editing operation. As a result, the editing processing of the phone directory, i.e., the processing A including the reading and writing processing of the phone directory is interrupted. In order to effectively utilize the time during the interruption, the MFP 200 switches the session to the low priority mode and permits the other mobile device 101 to use a part of the processing.

In the low priority mode, the MFP 200 differently copes with a case where the other mobile device 101 transmits a processing request for processing B satisfying the execution permission condition and a case where the other mobile device 101 transmits a processing request for processing not satisfying the execution permission condition. The processing B is processing that does not disturb the execution of the processing A, for example, scanning or printing processing when the processing A is the phone directory editing. In the processing B, the MFP 200 sends a reply of session permission to the other mobile device 101 and forms a session between the MFP 200 and the other mobile device 101. That is, in the low priority mode, the two different sessions may be formed. On the other hand, the processing that does not satisfy the execution permission condition may disturb the processing from the mobile device 100. Therefore, the MFP 200 sends a reply of session rejection to the other mobile device 101 and does not form a session between the MFP 200 and the other mobile device 101.

In the meantime, while the session for the processing B is formed between the MFP 200 and the mobile device 101, a session is not formed between the MFP 200 and a new mobile device requesting the using permission of the processing disturbing at least the execution of the processing B. For example, while the session formed between the MFP 200 and the mobile device 100 is the high priority mode, the session of the high priority mode is formed between the MFP 200 and the mobile device 100, so that a third mobile device different from the mobile device 101 and the mobile device 100 cannot form a session and is restricted from using the MFP 200. Also in this case, since the session with the mobile device 100 continues, the mobile device 100 can continue executing the processing A after the call is over.

In the meantime, after switching the session to the low priority mode, the MFP 200 completes the processing A instructed from the mobile device 100 when the job thereof can be continued, such as the printing and the scanning. Also, the MFP 200 interrupts the processing A when the processing A is processing which requires the user to explicitly input the completion, such as the phone directory editing. Then, the MFP 200 stores a processing result of the processing A, as progress information. When the processing instructed from the mobile device 100 is interrupted, a processing result until the interruption corresponds to the progress information. Further, when the processing instructed from the mobile device 100 is completed, a completion result corresponds to the progress information.

After the call with the mobile device 100 is over, the mobile device 100 transmits a call ending notification, which indicates that the call is over, to the MFP 200, as the call information. When the call ending notification is received, the MFP 200 switches the session from the low priority mode to the high priority mode. Thereby, a session formation from the other mobile device than the mobile device 100 is again rejected. In the meantime, when the call ending notification is received while the session with the other mobile device 101 is being formed, the session continues without being released. For this reason, there is a little disadvantage to a user of the other mobile device 101.

Also, after switching the session to the high priority mode, the MFP 200 transmits the progression information to the mobile device 100. The mobile device 100 having received the progress information restores the state of the application executed at the time of receiving the incoming call in conformity to the progressing of the processing A, based on the state of the application stored upon the incoming call and the progress information received from the MFP 200. For example, when the user is editing the phone directory and there is an incoming call during the recording to the phone directory, the mobile device 100 stores the state where the phone directory editing application instructs the writing of the information of the phone directory, i.e., the writing information and the like. On the other hand, in the low priority mode, the MFP 200 keeps a progressing result based on the writing instruction without sending back the same. Then, the MFP 200 displays a message, which indicates that the writing is successful, when the writing is successful, and returns the display to the state before the writing when the writing fails, based on the progress information. Thereby, the mobile device 100 can continue the processing A after the call is over.

After the processing A requested from the mobile device 100 is completed, the MFP 200 transmits a processing result to the mobile device 100. After the mobile device 100 determines that all of the processing A requested to the MFP 200 is completed, the mobile device 100 transmits a request for session release to the MFP 200. The MFP 200 releases the session formed between the MFP 200 and the mobile device 100, in response to the request for session release. The session is released, so that a session formation between the MFP 200 and the other mobile device 101 is permitted. Also, an input of a job through the operation panel 40 is permitted.

Figure 3:
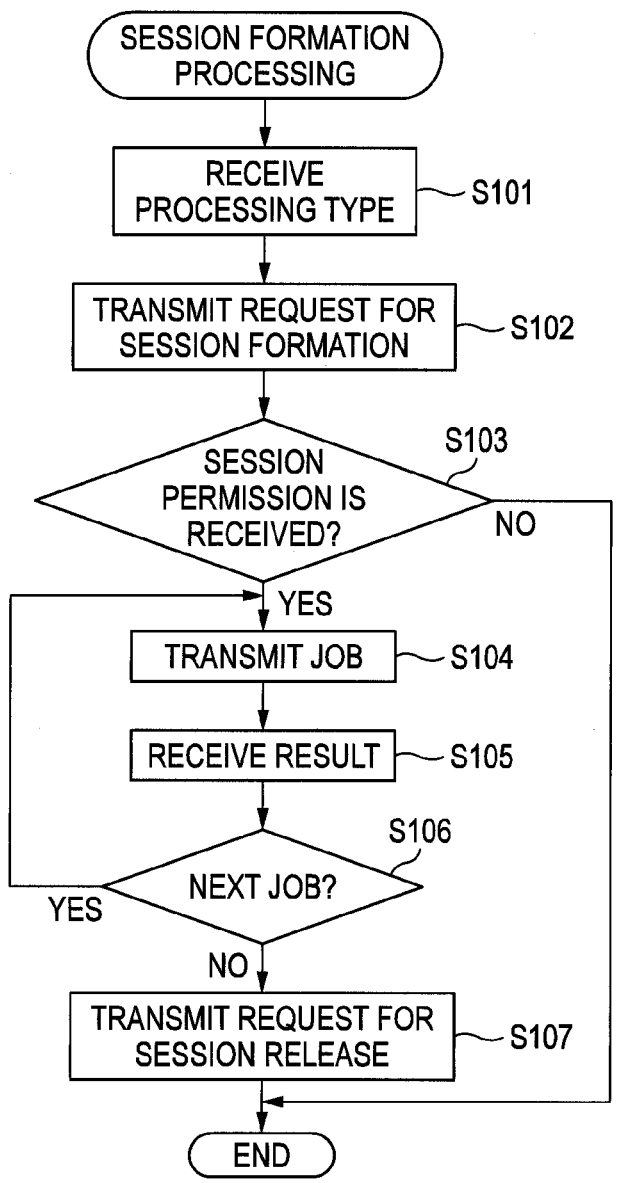
FIG. 3 is a flowchart showing a sequence of session formation processing that is executed by the mobile device in the first illustrative embodiment.

Next, the processing that is performed in the respective apparatuses so as to implement the sequence of the first illustrative embodiment of the image processing system 900 is described. First, session formation processing that is executed by the mobile device 100 is described with reference to a flowchart of FIG. 3. The session formation processing is executed by the CPU 51 when an application performing communication with the MFP 200 is activated. As the application, the phone directory editing application having a function of editing the phone directory, a FAX application having a function of outputting a FAX transmission instruction and an image editing application capable of issuing a scan or print instruction may be exemplified.

In the session formation processing of the first illustrative embodiment, the CPU 51 receives a type of the processing A of which using permission is requested by the application (S101). The type of the processing A is different depending on a function of the application. For example, in the phone directory editing application, the reading and writing of the phone directory are included in the type of the processing A. Then, the CPU 51 transmits a request for session formation to the MFP 200 (S102). The type of the processing A received in S101 is added to the request for session formation. Thereafter, the CPU 51 waits for a response from the MFP 200. The step S102 is an example of forming a specific state.

After receiving a response from the MFP 200, the CPU 51 determines whether a session permission is received or not (S103). When a session permission is not received (S103: NO), for example, when a session rejection is received and when there is no response from the MFP 200, the CPU 51 ends the session formation processing without transmitting a job.

When a session permission is received (S103: YES), a session with which a job relating to the processing A can be executed is formed between the mobile device 100 and the MFP 200. Thus, the CPU 51 transmits a job relating to the processing A (S104). Then, the CPU 51 receives an execution result of the job (S105). After S105, the CPU 51 determines whether there is a next job (S106). In S106, when the application is over, for example, the CPU 51 determines that there is no next job, and when the application is being executed, the CPU 51 determines that there is a next job. Also, for example, when it is confirmed that the application does not use a function which uses the MFP 200, the CPU 51 determines that there is no next job. When it is determined that there is a next job (S106: YES), the CPU 51 proceeds to S104 and transmits a job not transmitted yet.

When it is determined that there is no next job (S106: NO), the CPU 51 requests the MFP 200 to release the session (S107). Thereby, the session formed between the mobile device 100 and the MFP 200 is released. After S107, the CPU 51 ends the session formation processing.

Figure 4:
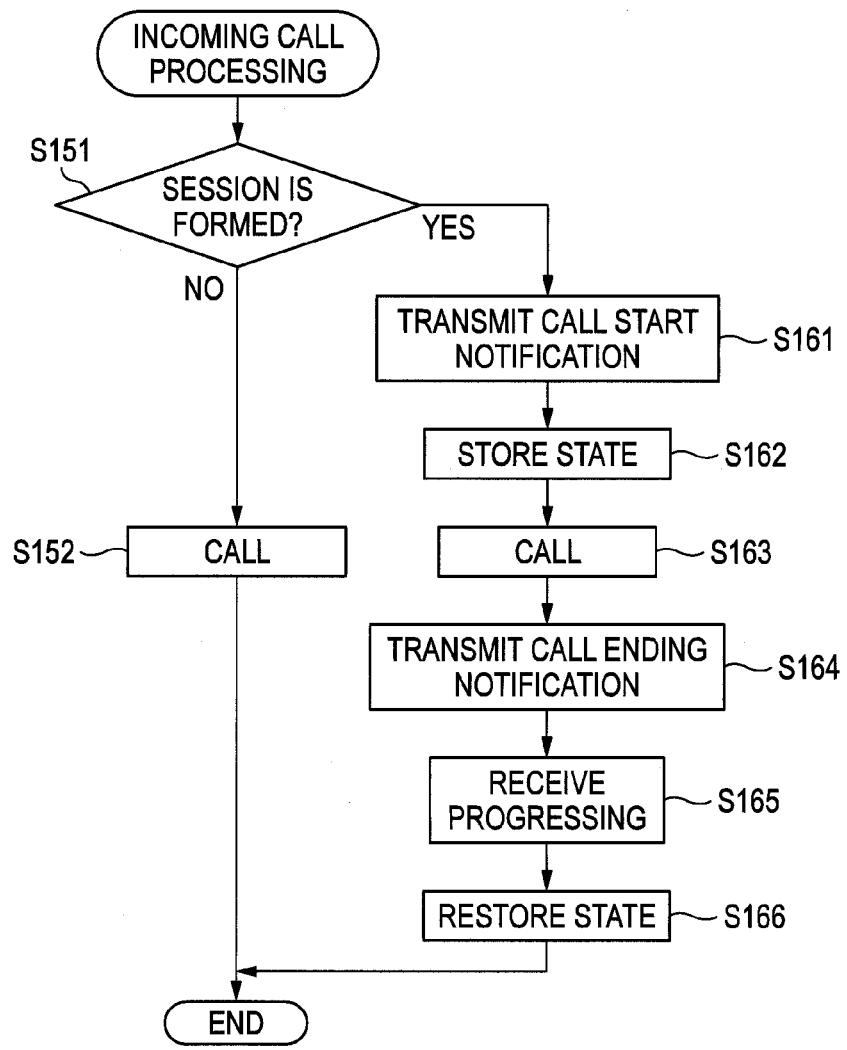
FIG. 4 is a flowchart showing a sequence of incoming call processing that is executed by the mobile device in the first illustrative embodiment.

Next, incoming call processing that is executed by the mobile device 100 is described with reference to a flowchart of FIG. 4. The incoming call processing is executed by the CPU 51 when the mobile device 100 responds to an incoming call.

In the incoming call processing of the first illustrative embodiment, the CPU 51 first determines whether a session is formed between the mobile device 100 and the MFP 200 (S151). When it is determined that a session is not formed (S151: NO), the CPU 51 starts call-related processing (S152). When the call is over, the CPU 51 ends the incoming call processing.

On the other hand, when it is determined that a session is formed between the mobile device 100 and the MFP 200 (S151: YES), the CPU 51 transmits a call start notification to the MFP 200 forming the session (S161). Then, the CPU 51 stores the state of the application (S162). For example, when the phone directory is being edited, the CPU 51 stores a state where the editing is being performed. The step S162 is an example of a storing an execution state. The steps S161, S162 may be executed in reversed order or may be simultaneously executed.

After S162, the CPU 51 starts the call-related processing (S163). After the call is over, the CPU 51 transmits a call ending notification to the MFP 200 (S164). After S164, the CPU 51 receives the progress information from the MFP 200, which is accompanied by the reception of the call ending notification (S165). As described above, the progress information is the information in which the progressing of the processing instructed from the mobile device 100 is stored when the MFP 200 is switched from the high priority mode to the low priority mode. The timing at which the progress information is stored will be described later.

After S165, the CPU 51 restores the state of the application based on the current processing status of the MFP 200, based on the received progress information and the state of the application stored in S162 (S166). The step S166 is an example of resuming the first processing. After S166, the CPU 51 ends the incoming call processing.

Next, session management processing that is executed by the MFP 200 is described with reference to a flowchart of FIG. 5 (5A, 5B). The session management processing is executed by the CPU 31 when the request for session formation is received. In the descriptions hereinafter, it is assumed that the request for session formation is received from the mobile device 100.

In the session management processing of the first illustrative embodiment, the CPU 31 first determines whether a session has been already formed (S201). When it is determined that a session is not formed (S201: NO), the CPU 31 transmits a session permission to the mobile device 100 (S202). Then, the CPU 31 sets a session to be formed to the high priority mode (S203). Thereby, a session with which a job relating to the processing A can be executed is formed between the MFP 200 and the mobile device 100. The step S203 is an example of forming a first state.

On the other hand, when it is determined that a session is formed (S201: YES), the CPU 31 determines whether the high priority mode is set (S211). When it is determined that the high priority mode is set (S211: YES), the CPU 31 transmits a session rejection to the mobile device 100 (S241). After S241, the CPU 31 ends the session management processing without forming a session between the MFP 200 and the mobile device 100.

When it is determined that the high priority mode is not set, i.e., that the low priority mode is set (S211: NO), the CPU 31 determines whether the processing of which using permission is requested by the request for session formation satisfies an executable condition (S212). In the low priority mode, as described above, even though the session has been already formed, if the other mobile device transmits a request for using of processing satisfying the execution permission condition, the CPU 31 also forms a session between the MFP 200 and the other mobile device. The execution permission condition may include processing that does not disturb the execution of the processing permitted in the existing session.

Specifically, as shown in FIG. 6, the MFP 200 has a matrix for determining whether the execution permission condition is satisfied in a combination of the processing permitted in the existing session and the processing of which using permission is requested by the request for session formation of this time. In the matrix of FIG. 6, 'o' indicates that the execution permission condition is satisfied, and 'x' indicates that the execution permission condition is not satisfied. When the using permission for a plurality of processing is requested, the execution permission condition is satisfied in S212 if the execution permission condition is satisfied for all processing.

For example, in the printing, print jobs are just accumulated in a queue. Thus, even when the print jobs from the mobile device requesting the session formation are accumulated in the queue, the print jobs from the mobile device having formed the session can be executed. Also, if the processing of which using permission is requested from the mobile device requesting the session formation is processing irrelevant to the printing, the print jobs from the mobile device having formed the session are not disturbed as regards the execution thereof. For this reason, when the processing in the existing session is 'printing', if the processing in this time session is processing other than copy, it can be executed ('o'). The copy cannot be executed ('x') so as to avoid contention between the data read out by the image reading unit 20 and the data transmitted from the mobile device. Also, regarding the reading of the phone directory, the data is simply read out and the phone directory itself is not edited. For this reason, when the processing in the existing session is 'phone directory reading', any processing can be executed ('○') in this time session.

On the other hand, the writing of the phone directory may disturb the FAX transmission job and the phone directory editing job, which are executed by the mobile device having formed the session, because a FAX transmission destination may be changed or the consistency of the data may be deteriorated. For this reason, when the processing in the existing session is 'FAX transmission' or 'phone directory writing', if the processing in this time session is 'phone directory writing', it cannot be executed ('×'). Also, the scan may disturb the jobs accompanied by the scan, which is executed by the mobile device having formed the session, because there is a possibility that the document will be interchanged. For this reason, when the processing in the existing session is 'copy', 'FAX transmission' or 'scan', if the processing in this time session is 'scan', it cannot be executed ('×').

In S212 of this illustrative embodiment, the CPU 31 determines whether or not to permit the session with the other mobile device 101, based on the executable conditions of the matrix shown in FIG. 6. However, the method of determining whether or not to permit the session is not limited thereto. That is, in the low priority mode, it is only necessary that the processing is less restricted as compared to the high priority mode. For example, in the low priority mode, when processing of which using permission is requested includes the same processing as the processing A, the processing may be rejected, and when the processing does not include the same processing as the processing A, i.e., when the processing is different from the processing A, the processing may be permitted. Also, for example, when processing of which using permission is requested is processing changing the setting information stored in the MFP 200, the processing may be rejected, and when the processing does not change the setting information, for example, when the processing is processing executing the image processing such as print and scan, the processing may be permitted. As the setting information, setting information relating to a function lock disabling a specific function from being executed may be exemplified, for example, in addition to the phone directory.

Figure 5B:
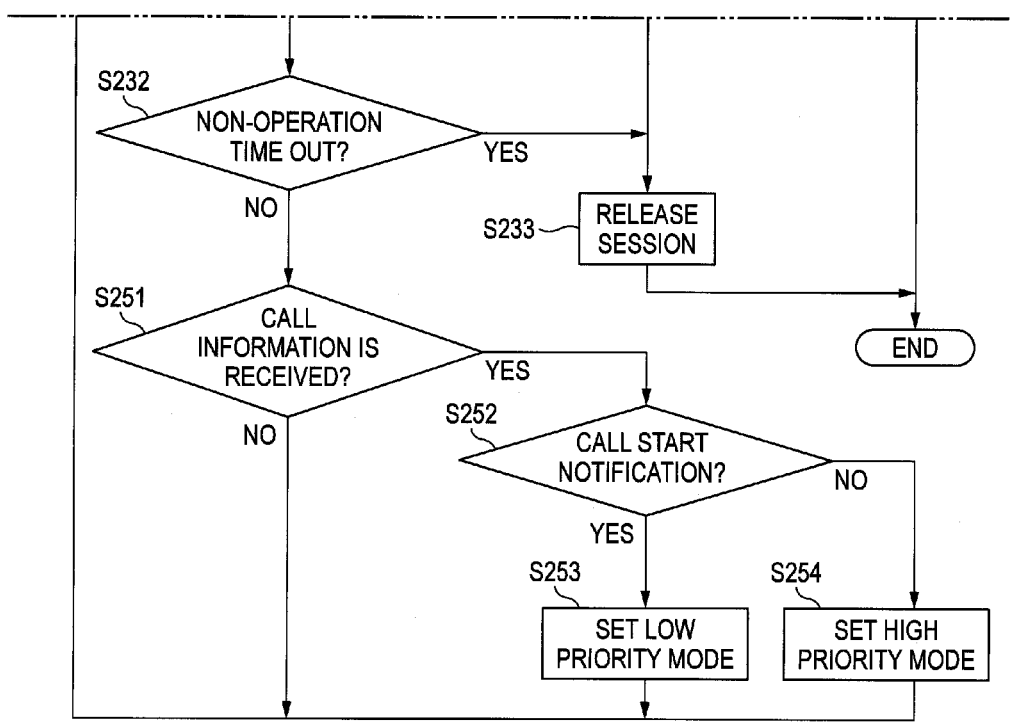
FIG. 5 (5A, 5B) is a flowchart showing a sequence of session management processing that is executed by the MFP (complex machine) in the first illustrative embodiment.

In FIG. 5A, when it is determined that the processing satisfies the executable condition (S212: YES), the CPU 31 proceeds to S202 and transmits a session permission. That is, the CPU 31 forms a new session between the MFP 200 and the mobile device 100 having transmitted the request for session formation. On the other hand, when it is determined that the processing cannot be executed (S212: NO), the CPU 31 proceeds to S241 and transmits a session rejection. That is, the CPU 31 does not form a session between the MFP 200 and the mobile device 100 having transmitted the request for session formation.

After setting the high priority mode in S203, the CPU 31 determines whether there is the progress information of the processing A relating to the mobile device 100 having transmitted the request for session formation (S221). When it is determined that there is the progress information (S221: YES), the CPU 31 transmits the progress information to the mobile device 100 (S222). The step S222 is an example of transmitting the progress information. After S222, the CPU 31 deletes the transmitted progress information (S223).

After S223 or when it is determined that there is no progress information (S221: NO), the CPU 31 determines whether the request for session release is received from the mobile device 100 having formed the session (S231).

When it is determined that the request for session release is not received (S231: NO), the CPU 31 determines whether a non-operation time out condition is satisfied (S232). When the call is performed for a long time or when the user moves away from a communication range of the MFP 200 together with the mobile device 100, a time period during which the session is not released becomes long, so that the using frequency of the MFP 200 may be remarkably lowered. For this reason, the non-operation time out condition is provided so as to forcibly release the session from the MFP 200 when a signal is not transmitted from the mobile device 100 for a threshold time period. The signal from the mobile device 100 may include a periodic signal such as a status check, in addition to a job execution command.

When it is determined that the request for session release is received from the mobile device 100 having formed the session (S231: YES), the CPU 31 releases the session formed between the MFP 200 and the mobile device 100 (S233). When it is determined that the non-operation time out condition is satisfied (S232: YES), the session formed between the MFP 200 and the mobile device 100 is also released (S233). In this case, the step S233 is an example of releasing the specific state. After S233, the CPU 31 ends the session management processing.

On the other hand, when it is determined that the non-operation time out condition is not satisfied (S232: NO), the CPU 31 determines whether the call information is received from the mobile device 100 having formed the session (S251). When the call information is received (S251: YES), the CPU 31 determines whether the call information is the call start notification (S252).

When it is determined that the call information is the call start notification (S252: YES), the CPU 31 sets the formed session to the low priority mode (S253). The step S253 is an example of forming a second state. When it is determined that the call information is not the call start notification (S252: NO), the CPU 31 sets the formed session to the high priority mode (S254).

After S253, after S254 or when it is determined that the call information is not received from the mobile device 100 having formed the session (S251: NO), the CPU 31 proceeds to S231. Then, the CPU 31 repeats S231 and thereafter until the session is released.

The MFP 200 executes the session management processing for each mobile device having transmitted the request for session formation. Also, either of the high priority mode and the low priority mode is set for each mobile device having formed the session. For this reason, the MFP 200 may operate in the low priority mode for the mobile device 100 and operate in the high priority mode for the mobile device 101. When a plurality of sessions is formed, if the high priority mode is set for at least one of them, the determination result in S211 of FIG. 5A is YES.

Figure 7:
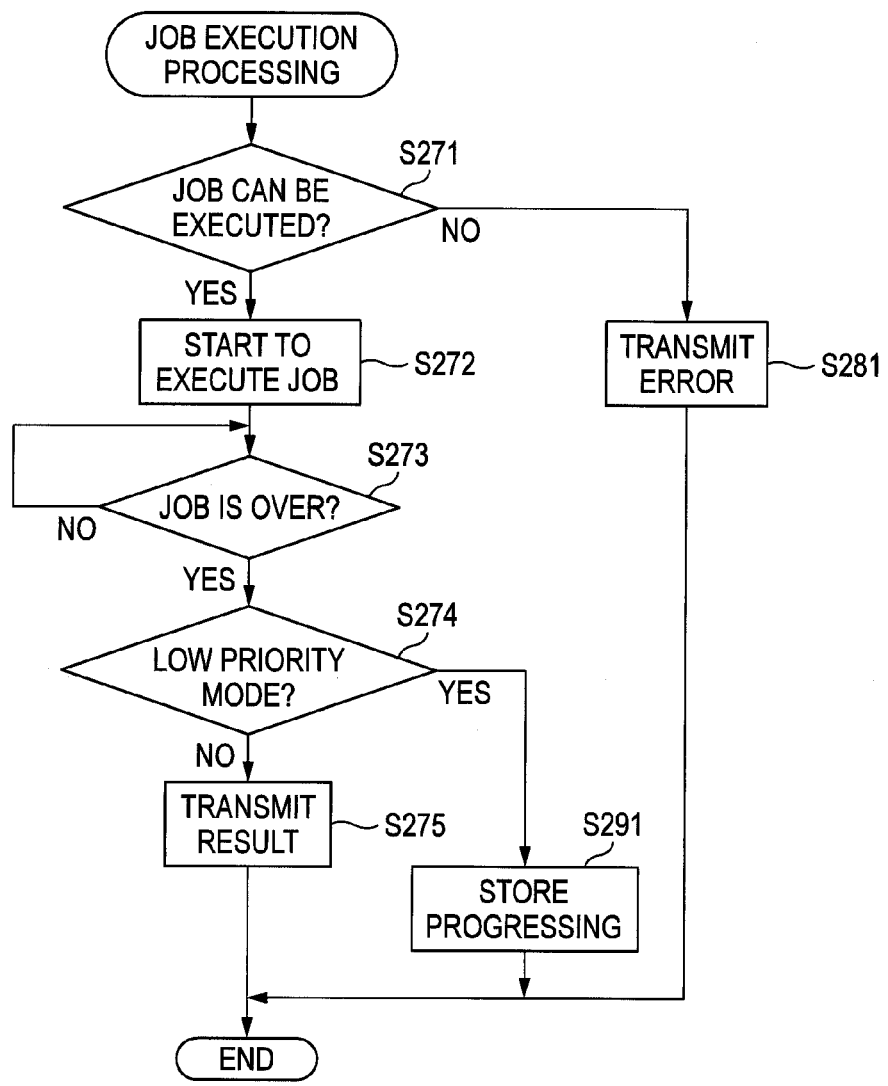
FIG. 7 is a flowchart showing a sequence of job execution processing that is executed by the MFP in the first illustrative embodiment.

Next, job execution processing that is executed by the MFP 200 is described with reference to a flowchart of FIG. 7. The job execution processing is executed by the CPU 31 when a job is received at a state where the session is formed. In the descriptions hereinafter, it is assumed that the session is formed between the MFP 200 and the mobile device 100.

In the job execution processing of the first illustrative embodiment, the CPU 31 first determines whether the job can be executed (S271). The MFP 200 can set the function lock disabling a specific function from being executed, and disables a job from being executed for processing for which the function lock is set. In addition, when an error such as outof-sheet and colorant deficiency occurs, the job cannot be executed with respect to processing that cannot be executed due to the error. When it is determined that the job cannot be executed (S271: NO), the CPU 31 transmits the error to the mobile device 100 having transmitted the job (S281) and ends the job execution processing.

When it is determined that the job can be executed (S271: YES), the CPU 31 starts to execute the received job (S272). After that, the CPU 31 determines whether the job is over (S273). When it is determined that the job is not over (S273: NO), the CPU 31 waits until the job is over.

When it is determined that the job is over (S273: YES), the CPU 31 determines whether the low priority mode is set (S274). As described above, when there is an incoming call, the MFP 200 is switched to the low priority mode. When it is determined that the low priority mode is not set (S274: NO), the CPU 31 transmits a processing result to the mobile device 100 having transmitted the job (S275). On the other hand, when it is determined that the low priority mode is set (S274: YES), the CPU 31 stores the progress information of the job (S291). The step S291 is an example of storing progress information. After S275 or after S291, the CPU 31 ends the job execution processing.

As described above, when the MFP 200 of the image processing system 900 of the first illustrative embodiment receives the call start notification from the mobile device 100 while the session of the high priority mode is formed between the MFP 200 and the mobile device 100, the MFP 200 is shifted to the low priority mode in which the processing is less restricted than the high priority mode. Thereby, the possibility that the mobile device 101 other than the mobile device 100 will be able to use the MFP 200 can be improved. As a result, it is possible to expect the efficient utilization of the MFP 200.

Next, a second illustrative embodiment where the mobile device 100 uses the MFP 200 in the image processing system 900 is described. In the second illustrative embodiment, two modes of the high priority mode and the low priority mode can be set, like the first illustrative embodiment. However, in the second illustrative embodiment, even when the low priority mode is set, a part of the processing incapable in the high priority mode is not capable. Instead, according to the second illustrative embodiment, the threshold time until the non-operation time out, which is set in the low priority mode, is shorter than the threshold time until the non-operation time out, which is set in the high priority mode.

Figure 8B:
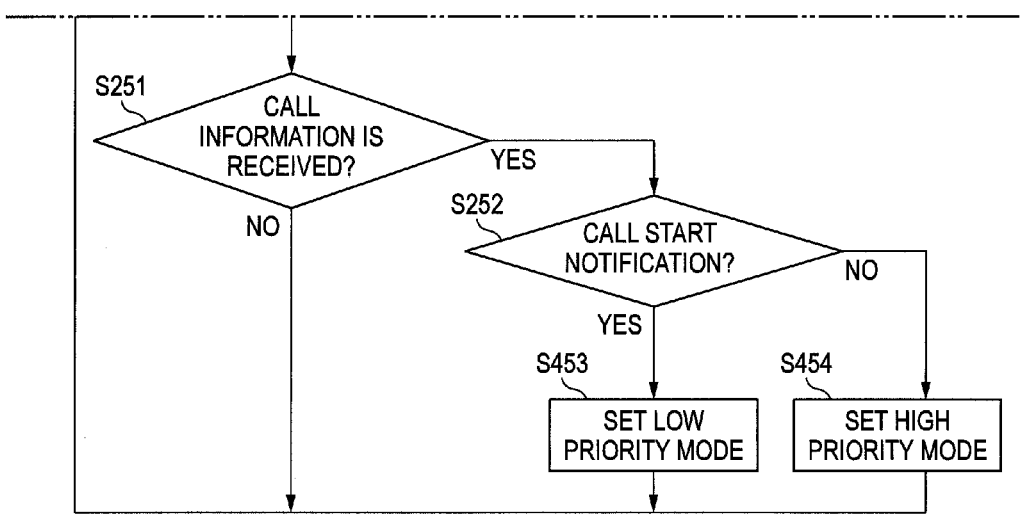
FIG. 8 (8A, 8B) is a flowchart showing a sequence of session management processing that is executed by the MFP in a second illustrative embodiment.

In the second illustrative embodiment, the session management processing that is executed by the MFP 200 is different from that in the first illustrative embodiment. For this reason, the session management processing is described with reference to a flowchart of FIG. 8 (8A, 8B). In the flowchart of FIG. 8 (8A, 8B), the same processing as the flowchart of FIG. 5 (5A, 5B) is denoted with the same reference numerals.

In the session management processing of the second illustrative embodiment, the CPU 31 determines whether a session has already been formed (S201). When it is determined that a session is formed (S201: YES), the CPU 31 transmits a session rejection to the mobile device 100 having transmitted the request for session formation (S241). That is, when the session has been already formed, a session is not formed between the MFP 200 and the other mobile device. After S241, the CPU 31 ends the session management processing without forming a session between the MFP 200 and the mobile device 100 having transmitted the request for session formation.

When it is determined that a session is not formed (S201: NO), the CPU 31 transmits a session permission to the mobile device 100 (S202). The steps from S202 to S251 are the same as the first illustrative embodiment.

In the second illustrative embodiment, when the CPU 31 receives the call information (S251: YES) and when the call information is the call start notification (S252: YES), the CPU 31 sets the session to the low priority mode (S453). At this time, the CPU 31 sets the threshold time of the non-operation time out in S232 shorter than the threshold time in the high priority mode. On the other hand, when the call information is the call ending information (S252: NO), the CPU 31 sets the session to the high priority mode (S454). At this time, the CPU 31 resets the threshold time of the non-operation time out in S232 to the original threshold time from the time changed in S453.

As described above, the MFP 200 of the image processing system 900 in the second illustrative embodiment shortens the threshold time of the non-operation time out in the low priority mode, thereby enabling the non-operation time out condition to be satisfied more easily, as compared to the high priority mode. Thereby, the session is easily released, and the processing of the other mobile device 101 can be executed more easily, as compared to the high priority mode.

The illustrative embodiments are merely examples and do not limit the present invention. Therefore, the present invention can be variously improved and modified without departing from the gist of the present invention. For example, any communication apparatus can be used as far as it has a function that can be used by the mobile device 100. For example, a copier, a printer, a scanner and a FAX apparatus may be also possible, in addition to the MFP.

In the above-described illustrative embodiments, the request for session formation is transmitted when the application of the mobile device 100 is activated. However, the transmission timing of the request for session formation is not limited thereto. For example, the request for session formation may be transmitted at a timing at which a job execution command is input through the application after the application is activated.

In the above-described illustrative embodiments, when the session is formed between the MFP 200 and the mobile device 100, a session is not formed between the MFP 200 and the other mobile device 101 during the high priority mode, irrespective of the processing content. However, the present invention is not limited thereto. That is, the execution of the processing A may be limited for at least the other mobile device 101, and the execution of some processing other than the processing A may be permitted.

In the above-described illustrative embodiments, in the low priority mode, the execution of some processing is permitted for the other mobile device 101 and the threshold time until the non-operation time out is shortened. However, the aspect of the low priority mode is not limited thereto. That is, in the low priority mode, it is only necessary that the execution of the processing of the other mobile device 101 is less restricted as compared to the high priority mode. For example, in the low priority mode, other the non-operation time out of S232, a time out corresponding to a long time call may be added in which the time out condition is satisfied on condition that the mobile device 100 is not operated after the call start notification is received until a predetermined time elapses, i.e., on condition that the call continues even when the predetermined time elapses. Also in this case, the session can be easily released, so that the processing of the other mobile device 101 can be executed more easily, as compared to the high priority mode. Also, the low priority mode may be configured by a combination of the aspects of the first and second illustrative embodiments.

In the above-described illustrative embodiments, the MFP 200 determines whether the non-operation time out condition is satisfied and automatically releases the session. However, the mobile device 100 having formed the session may determine whether the non-operation time out condition is satisfied and transmit the request for session release when the non-operation time out condition is satisfied.

In the above-described illustrative embodiments, when the call starts at the mobile device, the state of the processing is stored in both the mobile device and the MFP, and when the call is over, the original state is restored based on the stored state. However, this processing may be omitted.

The processing of the illustrative embodiments may be executed by hardware such as a single CPU, a plurality of CPUs and an ASIC, or a combination thereof. Also, the processing of the illustrative embodiments can be implemented in a variety of aspects such as a storage medium having a program for executing the processing stored therein, a method and the like.

The present invention provides illustrative, non-limiting examples as follows:

(1) A communication apparatus configured to perform communication with a mobile device, the communication apparatus including: a processor; and a memory storing instructions that, when executed by the processor, cause the communication apparatus to perform: forming a first state which is a specific state for performing communication with a first mobile device having a telephone function, wherein, in the first state, an execution of first processing instructed from the first mobile device is capable, and wherein, in the first state, an execution of a plurality of processing including the first processing, which is instructed from a second mobile device different from the first mobile device, is incapable, and forming a second state, which is the specific state, instead of the first state, if call receiving information, which is output from the first mobile device due to the first mobile device receiving a call request from external, is received while the first state is formed, wherein, in the second state, an execution of a part of processing among the plurality of processing incapable in the first state is capable.

The communication apparatus is configured to form the specific state for performing communication with the mobile device. The specific state includes the first state and the second state. In the first state, the first processing is able to be executed for the first mobile device and the plurality of processing including the first processing is incapable of being executed for the second mobile device. In the second state, the execution of the processing is not incapable for the second mobile device, as compared to the first processing in which some of the plurality of processing is permitted. The first processing that is executed by the communication apparatus includes print, scan, FAX transmission, phone directory editing, copy, password setting, function lock setting, and a variety of setting to be input by a panel operation, for example. In the first state, the execution of all processing including the execution of the first processing may be incapable, or the execution of a part of the processing including the first processing may be incapable.

Also, in the second state, the execution of a part of the processing of the plurality of processing of which execution is incapable in the first state is permitted. For example, in the first state, all processing that can be instructed to the communication apparatus by the second mobile device may be incapable for the second mobile device, and in the second state, processing different from the first processing may be capable of being executed. Also, for example, in the first state, the plurality of processing including the first processing may be incapable for the second mobile device, and in the second state, at least one of the processing incapable in the first state may be capable of being executed. By increasing the number of executable processing in the second state, the availability of the communication apparatus can be increased.

Further, according to the communication apparatus, when the call information output from the first mobile device is received while the first state is formed, the second state is formed instead of the first state. Thereby, the availability of the communication apparatus from the second mobile device different from the first mobile device can be improved. As a result, efficient utilization of the communication apparatus can be expected.

(2) The communication apparatus according to (1), wherein, in the first state, an execution of processing instructed by all instructions from the second mobile device through a first protocol is incapable and an execution of processing instructed by an instruction from the second mobile device through a second protocol different from the first protocol is capable.

(3) The communication apparatus according to (1) or (2), wherein, in the specific state, a session is formed between the communication apparatus and the mobile device, wherein, in the first state, a session is formed between the communication apparatus and the first mobile device, and wherein, in the second state, a session is formed between the communication apparatus and each of the first mobile device and the second mobile device.

(4) The communication apparatus according to any one of (1) to (3), wherein the part of the processing permitted in the second state includes second processing different from the first processing.

The second processing different from the first processing less influences the first mobile device. For this reason, the second processing is preferable as the processing permitted in the second state.

(5) The communication apparatus according to any one of (1) to (3), wherein the part of the processing permitted in the second state includes processing that does not disturb the execution of the first processing.

The processing that does not disturb the execution of the first processing less influences the first mobile device. For this reason, the processing is preferable as the processing permitted in the second state.

(6) The communication apparatus according to any one of (1) to (3), further including an image processing execution unit configured to execute image processing, wherein the part of the processing permitted in the second state includes the image processing executed by the image processing execution unit and does not include processing that changes setting information stored in the communication apparatus.

(7) The communication apparatus according to (6), wherein the setting information includes identification information of an external apparatus, which is used when the communication apparatus performs communication with the external apparatus.

If the processing of changing the setting information is permitted, it highly influences the first mobile device. For this reason, the processing is preferably not permitted in the second state.

(8) The communication apparatus according to any one of (1) to (7), wherein the forming releases the specific state after the second state is formed, on condition that a signal is not received from the first mobile device due to that the first mobile device has not been operated for a predetermined time after the call receiving information has been received.

In the second state, when the time during which an operation is not performed after the call information has been received continues for a predetermined time, the specific state is released. Accordingly, that the availability of the communication apparatus by the second mobile device can be improved.

(9) The communication apparatus according to any one of (1) to (7), wherein the instructions stored in the memory, when executed by the processor, cause the communication apparatus to further perform: releasing the specific state, on condition that a signal is not received from the first mobile device due to that the first mobile device has not been operated for a longer time than a threshold time, and wherein the forming forms the second state so that the threshold time is shorter than that in the first state.

In the second state, the time until the specific state is automatically released is shortened due to the non-operation. Accordingly, the availability of the communication apparatus can be increased.

(10) The communication apparatus according to (9), wherein the forming forms the second state so that an execution of second processing, which is different from the first processing and is instructed from the second mobile device, is capable, and an execution of at least the second processing among processing instructed from a third mobile device is incapable.

After receiving the call information, when the execution of the second processing is instructed from the second mobile device while the specific state with the first mobile device is maintained, by making the execution of the second processing capable, the availability of the communication apparatus can be increased. Further, by restricting the execution of the second processing instructed from the third mobile device, it is possible to reduce an influence on the communication between the second mobile device and the communication apparatus.

(11) The communication apparatus according to any one of (1) to (10), wherein the instructions stored in the memory, when executed by the processor, cause the communication apparatus to further perform: storing progress information of the first processing when the forming forms the second state, and transmitting the progress information to the first mobile device if the progress information has been stored when the forming forms the first state.

When the second state is formed, the progress information of the first processing executed until then is stored, and when the first state with the first mobile device is again formed, the progress information is transmitted to the first mobile device. Thereby, in the first mobile device, it is possible to secure the continuity of the first processing after the first state is again formed.

Also, a control method, a computer program and a computer-readable storage medium having the computer program stored therein for implementing the functions of the communication apparatus are also novel and useful. Also, a system including the communication apparatus and the mobile device is also novel and useful.

What is claimed is:

1. A communication apparatus configured to perform communication with a mobile device, the communication apparatus comprising:
   a communication interface;
   a processor; and
   a memory storing instructions that, when executed by the processor, cause the communication apparatus to perform:
      forming a first state which is a specific state for performing communication with a first mobile device having a telephone function, wherein, in the first state, an execution of first processing instructed from the first mobile device is capable, and wherein, in the first state, an execution of a plurality of processing including the first processing, which is instructed from a second mobile device different from the first mobile device, is incapable,
      receiving, via the communication interface, an instruction for executing the first processing from the first mobile device;
      executing the first processing instructed from the first mobile device while the first state is formed;
      receiving, via the communication interface, call receiving information, which is output from the first mobile device in response to the first mobile device receiving a call request from external, while executing the first processing and the first state is formed; and
      forming a second state, which is the specific state, instead of the first state, when the call receiving information is received wherein, in the second state, an execution of a part of processing among the plurality of processing incapable in the first state is capable.

2. The communication apparatus according to claim 1, wherein, in the first state, an execution of processing instructed by all instructions from the second mobile device through a first protocol is incapable and an execution of processing instructed by an instruction from the second mobile device through a second protocol different from the first protocol is capable.

3. The communication apparatus according to claim 1, wherein, in the specific state, a session is formed between the communication apparatus and the mobile device, wherein, in the first state, a session is formed between the communication apparatus and the first mobile device, and wherein, in the second state, a session is formed between the communication apparatus and each of the first mobile device and the second mobile device.

4. The communication apparatus according to claim 1, wherein the part of the processing permitted in the second state includes second processing different from the first processing.

5. The communication apparatus according to claim 1, wherein the part of the processing permitted in the second state includes processing that does not disturb the execution of the first processing.

6. The communication apparatus according to claim 1, further comprising an image processing execution unit configured to execute image processing,
   wherein the part of the processing permitted in the second state includes the image processing executed by the image processing execution unit and does not include processing that changes setting information stored in the communication apparatus.

7. The communication apparatus according to claim 6, wherein the setting information includes identification information of an external apparatus, which is used when the communication apparatus performs communication with the external apparatus.

8. The communication apparatus according to claim 1, wherein the forming releases the specific state after the second state is formed, on condition that a signal is not received from the first mobile device due to that the first mobile device has not been operated for a predetermined time after the call receiving information has been received.

9. The communication apparatus according to claim 1, wherein the instructions stored in the memory, when executed by the processor, cause the communication apparatus to further perform:
   releasing the specific state, on condition that a signal is not received from the first mobile device due to that the first mobile device has not been operated for a longer time than a threshold time, and
wherein the forming forms the second state so that the threshold time is shorter than that in the first state.

10. The communication apparatus according to claim 9, wherein the forming forms the second state so that an execution of second processing, which is different from the first processing and is instructed from the second mobile device, is capable, and an execution of at least the second processing among processing instructed from a third mobile device is incapable.

11. The communication apparatus according to claim 1, wherein the instructions stored in the memory, when executed by the processor, cause the communication apparatus to further perform:
   storing progress information of the first processing when the forming forms the second state, and
   transmitting the progress information to the first mobile device when the progress information has been stored when the forming forms the first state.

12. A mobile device capable of performing communication with a communication apparatus, the mobile device comprising:
   a processor; and
   a memory storing instructions that, when executed by the processor, cause the mobile device to perform:
      transmitting a request for forming a first state to the communication apparatus, wherein, in the first state, the communication device is capable of executing first processing instructed from the mobile device, and wherein, in the first state, the communication apparatus is incapable of executing a plurality of processing including the first processing, which is instructed from another mobile device different from the mobile device;
      forming a specific state in which first processing can be executed by the communication apparatus;
      storing an execution state of the first processing when a call request is received in a state where the specific state is formed,
      resuming the first processing based on the stored execution state and progress information when the progress information, which is output from the communication apparatus due to the specific state being formed, is received; and
      transmitting a request for releasing the first state to the communication apparatus when the first processing has been completed.

13. A non-transitory computer readable storage medium having a computer program stored thereon and readable by a computer of a communication apparatus, the computer program, when executed by the computer, causing the communication apparatus to perform operations comprising:
   forming a first state which is a specific state for performing communication with a first mobile device having a telephone function, wherein, in the first state, an execution of first processing instructed from the first mobile device is capable, and wherein, in the first state, an execution of a plurality of processing including the first processing, which is instructed from a second mobile device different from the first mobile device, is incapable,
   receiving, via a communication interface of the communication apparatus, an instruction for executing the first processing from the first mobile device;
   executing the first processing instructed from the first mobile device while the first state is formed;
   receiving, via the communication interface, call receiving information, which is output from the first mobile device in response to the first mobile device receiving a call request from external, while executing the first processing and the first state is formed; and
   forming a second state, which is the specific state, instead of the first state, when the call receiving information is received, wherein, in the second state, an execution of a part of processing among the plurality of processing incapable in the first state is capable.

* * * * *